(12) United States Patent
Hjelm et al.

(10) Patent No.: US 8,654,682 B2
(45) Date of Patent: Feb. 18, 2014

(54) METHOD AND APPARATUS FOR ENABLING SERVICES AND MEDIA IN A COMMUNICATION NETWORK

(75) Inventors: Johan Hjelm, Tokyo (JP); Theo Gerrit Kanter, Ronninge (SE); Mattias Lidstrom, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 189 days.

(21) Appl. No.: 13/128,424

(22) PCT Filed: Nov. 10, 2008

(86) PCT No.: PCT/SE2008/051284
§ 371 (c)(1),
(2), (4) Date: May 10, 2011

(87) PCT Pub. No.: WO2010/053418
PCT Pub. Date: May 14, 2010

(65) Prior Publication Data
US 2011/0222427 A1   Sep. 15, 2011

(51) Int. Cl.
*G01R 31/08* (2006.01)
*H04L 12/16* (2006.01)
*G06F 15/173* (2006.01)

(52) U.S. Cl.
USPC .......................... 370/259; 370/252; 709/224

(58) Field of Classification Search
None
See application file for complete search history.

(56) References Cited

U.S. PATENT DOCUMENTS

| | | | |
|---|---|---|---|
| 7,454,464 B2* | 11/2008 | Puthenkulam et al. | 709/204 |
| 8,244,857 B2* | 8/2012 | Jakob et al. | 709/224 |
| 2003/0018692 A1 | 1/2003 | Ebling | |
| 2005/0113123 A1 | 5/2005 | Torvinen | |
| 2005/0114493 A1* | 5/2005 | Mandato et al. | 709/223 |
| 2009/0125374 A1* | 5/2009 | Deaton et al. | 705/10 |

FOREIGN PATENT DOCUMENTS

| | | |
|---|---|---|
| WO | 0145342 A | 6/2001 |
| WO | 2006115442 A | 11/2006 |

* cited by examiner

*Primary Examiner* — Hassan Phillips
*Assistant Examiner* — Hicham Foud
(74) *Attorney, Agent, or Firm* — Rothwell, Figg, Ernst & Manbeck, P.C.

(57) ABSTRACT

A method and apparatus in a group manager of a central service node, for enabling services or media in a communication network. A monitoring unit detects and monitors activities and conditions of communication entities in the network. A context collecting unit collects individual context data relating to a plurality of monitored entities in order to survey the current situation of each respective entity. A group defining unit then defines a group of correlated entities that are found to be correlated or similar with respect to at least some feature or characteristics based on the collected individual context data, by selecting context parameters of relevance to the group and using one or more membership conditions determined for the group. If the monitored entities have changed their status in a predetermined way that affects the group, the group defining unit will update the group.

18 Claims, 5 Drawing Sheets

METHOD AND APPARATUS FOR ENABLING SERVICES AND MEDIA IN A COMMUNICATION NETWORK

CROSS-REFERENCE TO RELATED APPLICATION

This application is a 35 U.S.C. §371 National Phase Entry Application from PCT/SE2008/051284, filed Nov. 10, 2008, and designating the United States.

TECHNICAL FIELD

The invention relates generally to a method and apparatus for enabling the usage of relevant services for a group of communication entities.

BACKGROUND

With the emergence of 3G mobile telephony, new packet-based communication technologies using IP (Internet Protocol) have been developed to support the usage of multimedia services. A multitude of different mobile and fixed terminals capable of multimedia communication are also emerging on the market. New services are also constantly being developed for terminal users to increase the field of usage and enhance the quality of experience when generally consuming multimedia services.

An architecture called "IP Multimedia Subsystem" (IMS) has been developed as a platform for enabling multimedia services and sessions, commonly referred to as an IMS network, which can be used to initiate and control multimedia sessions for user terminals connected to various different access networks. Multimedia sessions are handled by specific session control nodes in the IMS network, including the nodes called P-CSCF (Proxy Call Session Control Function) and S-CSCF (Serving Call Session Control Function). Further, a database node HSS (Home Subscriber Server) stores subscriber and authentication data, and different application servers are used for delivering the multimedia services.

The signalling protocol called "SIP" (Session Initiation Protocol) is commonly used for handling multimedia sessions in IMS networks and other service networks. IMS is mentioned in this description for illustrative purposes, without limiting the invention to IMS networks exclusively. A user and his/her communication equipment is often referred to as a "client", which term will be used here.

A particular example of IMS enabled services is "presence" services, involving publication of presence data of a client to make it available to other clients or applications. Presence data basically refers to the status or state of the client, e.g. including the client's current geographical position, connection status and terminal capabilities, as well as any personal characteristics, preferences and settings. Presence information can be stored in a presence server in the IMS network, based on the publication of client related information. Such publications may be obtained either from the client's terminal or from the used network, whenever any presence data of the client becomes available or is updated.

A client may also subscribe for selected presence data of one or more other clients, e.g. according to a predefined list of an established client group sharing such presence data. Presence subscriptions are typically also handled by a presence server and may involve various information filters, admission rules and policies. The subscribing client can then receive notifications from the presence server regarding current presence data, either automatically or upon request.

In SIP, a message called "SIP PUBLISH" can be used by clients to provide data to the presence server. Further, a message called "SIP SUBSCRIBE" can be used by clients to subscribe for presence data of other clients, as handled by the presence server. Another message called "SIP NOTIFY" can be used by presence servers to present presence data to subscribing clients.

Solutions have also been devised for creating and providing relevant and potentially attractive services that are adapted to different service users according to their interests and assumed needs in different situations. It is therefore useful to identify the current overall situation of a service user, commonly referred to as the "context". So-called context information may include the presence information or data above, as well as available services, resources and network connections. It has also been proposed to extend the context information to include various measured or computed parameters such as service usage history and parameters related to the current environment such as temperature, ambient sounds, proximity to other clients, etc. In this description, the term "context information" generally represents any information related to a communication entity and his/her current situation, such as the above information types, although without being limited thereto.

In a peer-to-peer system with two or more communication entities, each entity has its own individual context. In this description, a communication entity may be a client terminal, a network server or other node, without limitation. Further, the term "peer-to-peer system" generally refers to a set of communication entities which communicate on a peer basis as opposed to, e.g., client-server communication.

The nodes in the peer-to-peer system make up a group for which a group context can be identified by aggregating the individual contexts of the group members. Various services can then be adapted to the shared characteristics of the group. WO 06/115442 discloses mechanisms where the assumed needs of a user group can be met by providing relevant context information that has been adapted to particular interests and needs of the group.

A concept has also been developed to provide refined information regarding clients, e.g. to increase the usability of applications for invoked services depending on the client's current context or behaviour. It may thus be valuable to use "context-aware" applications to optimally adapt services to the prevailing context of a client. A context server may then be used to collect information about the client by receiving client data from various sources, such as "sensors" or the like adapted to measure or register various variables or the like characterising the current state, status or situation of the client, e.g. temperature or geographical position.

The currently available mechanisms for providing presence data and context data for a client of interest to a requesting party are illustrated schematically in FIG. 1. The client of interest 100 is a user of a mobile terminal T that frequently sends dynamic data, or event publications, to a presence server 102 basically as described above, e.g. in SIP PUBLISH messages using an IMS network (not shown). The presence server 102 may in turn send notifications to the requesting party 104, e.g. a subscribing client, regarding current presence data, e.g. in SIP NOTIFY messages.

In addition or alternatively, one or more sensors 106 may be arranged as described above to provide "raw", i.e. non-processed, context data to a context server 108, the data being received and stored in a context storage unit 108a. For example, raw context data from sensors may be GPS (Global Positioning System) data which can be translated into geographical information. The shown sensors 106 may also represent functions reflecting client activities in the terminal T or in the used network, not shown. Moreover, existing routines in the communication network for generating call data records for clients can also be used to provide context data.

The stored raw data may then be processed and refined in a context refiner 108b by applying predefined rules 108c on the raw data, in order to derive or calculate new refined context information from the raw data. The predefined rules 108c may include algorithms or the like that calculate certain parameters, draw conclusions or create compilations from the raw data. The refined context can then be distributed to the requesting party 104 according to conventional routines, not described here further.

Typically, context information pertains to an individual client who has a certain profile. However, a client may also belong to an established group of clients, having an aggregated profile shared by its members. For example, members of a family group may have individual contexts while the family may have a common context and an aggregated profile shared by its members, whereas another group specifically interested in, e.g., football games may have a completely different profile.

The context information of a communication entity can be used to determine the relevance of various elements to the entity in communication with other entities or services. Such relevance may relate to the choice of services in applications, the choice of content to be exchanged by these services, their mode of operation, and so forth. Hence, it may be useful to have relevant context information available when creating and providing services and media to clients and other entities. Entities belonging to different communication groups may thus observe various context information of each other, e.g. including information originating from various sensors. Technically, the context of one entity could also include context information on other related entities.

As mentioned above, communication services and media can be adapted and provided in a system with plural entity peers based on the individual contexts of the entities, which can be aggregated into a group context. Furthermore, it may be desirable to create an optimised topology of communication entity peers, considering the contexts above, and to facilitate interconnections between the entities. If this could be accomplished, more attractive services may be possible involving efficient media transport between the entities, e.g. over short connections and/or using links and terminals with suitable characteristics and abilities.

However, the individual contexts of the entities in such a group typically fluctuate and change over time more or less randomly, e.g. when individual entities are reconfigured or change their status, or when certain services gain or lose popularity, and so forth. As a result, the aggregated group context will also change accordingly. Entities may also come and go unpredictably. Therefore, services and media that have been adapted to a group context more or less statically may well become unsuitable or irrelevant in some respect, due to the changing individual contexts. Moreover, a created network topology for shared communication and service usage may not be optimal or even useful anymore. It can be readily understood that it is not an easy task to manage a system with plural entity peers properly from the central service node and keep it up-to-date, to provide suitable or optimal services and media.

SUMMARY

It is an object of the present invention to enable the usage of relevant services for communication entities. For example, it may be desirable to facilitate the management of communication entities, e.g. as configured in a system with plural entities or peers, from the central service node and the provision of relevant communication services and/or media. This object and others may be achieved by providing a method and apparatus as defined by the attached independent claims.

According to one aspect, a method is provided in a group manager of a central service node, of enabling services or media in a communication network. In this method, activities and conditions of communication entities in the network are detected and monitored. Further, individual context data relating to a plurality of monitored entities is collected in order to survey the current situation of each respective entity. Then, a group of correlated entities that are found to be correlated with respect to one or more features or characteristics based on the collected individual context data, is defined by selecting context parameters of relevance to the group and using one or more membership conditions determined for the group. The group is further updated if the monitored entities have changed their status in a predetermined way that affects the group.

According to another aspect, an apparatus is provided in a group manager of a central service node for enabling services or media in a communication network. This apparatus comprises a monitoring unit, a context collecting unit and a group defining unit. The monitoring unit is adapted to detect and monitor activities and conditions of communication entities in the network. The context collecting unit is adapted to collect individual context data relating to a plurality of monitored entities in order to survey the current situation of each respective entity. The group defining unit is adapted to define a group of correlated entities that are found to be correlated or similar with respect to one or more features or characteristics based on the collected individual context data, by selecting context parameters of relevance to the group and using one or more membership conditions determined for the group. The group defining unit is further adapted to update the group if the monitored entities have changed their status in a predetermined way that affects the group.

When using the method and apparatus above, the group of entities or entity peers can be managed automatically and be kept up-to-date as the individual context parameters of the entities change or fluctuate over time. Thereby, relevant services can be provided for communication entities in the group.

The above method and apparatus in the group manager can be configured according to different embodiments. In one embodiment, the group defining unit updates the group if the membership conditions have been violated by one or more monitored entities. The group may also be updated if one or more monitored entities have been logged off or moved away from a given area, or if one or more entities have entered or been logged on in the area.

In further embodiments, updating the group may include changing the context parameters of relevance and/or the membership conditions. Updating the group may also include excluding or adding an entity from/to the group. Detecting communication entities in the network may include detecting entities that are active in a specific area, or log on to the network or log off therefrom.

In further embodiments, the group defining unit takes the collected individual context data from individual entity profiles which contain information on the respective monitored entities, compiled from incoming context and presence data. The selected context parameters of relevance to the group may define the common characteristics of the group, which is manifested in a group profile that can be used as a basis for producing adapted communication services or media for the group.

The group defining unit may also select the relevant context parameters by comparing the individual contexts to find entities correlated with respect to the one or more features or characteristics using a machine learning function. The relevant context parameters may also be selected actively by a set of individual users that wish to form or join the group, or selected from predefined context parameter templates.

Further possible features and benefits of the present invention will become apparent from the detailed description below.

BRIEF DESCRIPTION OF THE DRAWINGS

The present invention will now be described in more detail by means of preferred embodiments and with reference to the accompanying drawings, in which.

DETAILED DESCRIPTION

Briefly described, the present invention provides a mechanism for organising a plurality of communication entities in a network, e.g. a peer-to-peer network, in an efficient manner in order to provide relevant and apt communication services or media to these entities, given the properties or characteristics of their respective current contexts. This can basically be accomplished by means of a new functional unit to be described herein called "Group Awareness Function GAF", which may be implemented in a central service node in an IMS network or similar. The GAF may operate according to the embodiments or features described below. In this description, the term "a plurality of" generally represents any number more than one.

The GAF may be configured to collect data or information relating to the individual contexts and profiles of the entities, and to identify one or more groups of active entities having profiles that fall within certain limits that can be defined for each respective group. Thus, having detected a plurality of active entities and collected information on their profiles and contexts, the GAF can identify a group of entities which are correlated or similar in some respect. The GAF can also select specific context parameters which are deemed relevant to the group, and set limits to these context parameters as conditions for group membership. That is, if the current individual context of an entity falls within the set context parameter limits, that entity is qualified as a member of the group. Some examples of context parameters for which for membership conditions can be determined are various behavioural parameters such as usage of particular services or media, e.g. at certain times of day, week or season, and geographical movements, as well as various environmental parameters such as temperature, ambient sounds, etc.

Figure 1:
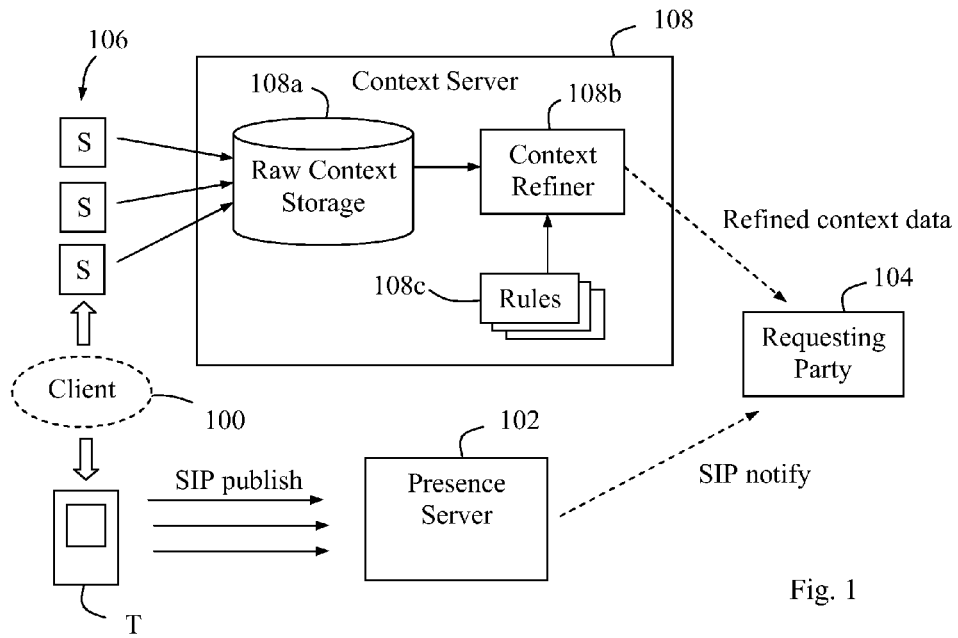
FIG. 1 is a block diagram illustrating how presence data and refined context data can be provided to a requesting party, according to the prior art.
Figure 2:
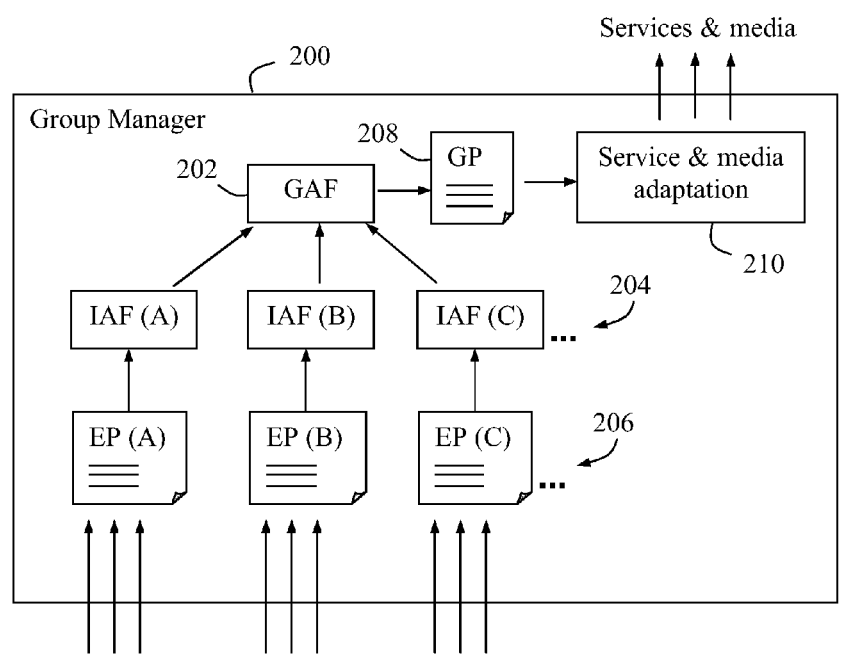
FIG. 2 is a block diagram illustrating a group awareness function that can be used to provide adapted services and media for a group of communication entities, according to one embodiment.

FIG. 2 is a block diagram illustrating a practical example of how such a group of plural communication entities can be handled or supervised on a more or less continuous basis, in order to produce and provide communication services or media which can be deemed relevant or even optimal to at least some of the entities in the group. A group manager 200 is shown, which may generally be implemented in a central service node, e.g. in an IMS network or similar, or in a distributed fashion e.g. over a plurality of network nodes or communication entities.

The group manager 200 comprises a GAF 202 and a plurality of "Individual Awareness Functions, IAF's" 204, each providing data or information to GAF 202 on the individual contexts of a plurality of communication entities A, B, C, ..., not shown here. In this example, context data is taken from individual Entity Profiles EP's 206 each containing information on a respective individual entity A, B, C, ..., compiled from incoming context and presence data, as shown in the figure. However, the present invention is not limited to using the shown IAF's 204 and EP's 206, and GAF 202 may collect information on the individual contexts in any other suitable manner.

The information on an individual entity in the EP 206 can be any data related to that entity, including preferences, policies, credentials, context and presence data, or information from other context sources. It may also include information about relations to other entities, memberships of entity groups, as well as subscriptions to information on other entities. All this information and other entity related data is thus referred to as context data in this description for simplicity.

In this example, GAF 202 collects or receives relevant context data from the IAF's 204 and identifies a group of communication entities which are mutually correlated or similar in some respect, based on the collected context data. A set of context parameters deemed relevant to the group is selected to define the common characteristics of the group, which is also manifested in a Group Profile GP 208.

In this description, a group profile such as the GP 208 generally comprises context information related to group specific aspects, and this group context information can be seen as an aggregated context, or a set of key parameters forming an aggregated context, that pertains to the group as a whole. GAF 202 also sets limits to the selected context parameters to define membership conditions for the group, i.e. rules dictating which entities are entitled or qualified to belong to the group.

GAF 202 also continues to collect context data from the IAF's 204, at least with respect to the selected context parameters, and will therefore keep this information up-to-date. Thereby, the GP 208, as well as the membership conditions and resulting group composition, can be dynamically updated as the individual contexts of the entities change or fluctuate over time, which will be described in more detail later below.

The GP 208 can then be used as a basis for producing adapted communication services or media for the group, as illustrated in the figure by a service and media adaptation block 210, and the adapted services or media can be utilised, offered or provided to the group members in a suitable manner. In this way, the services or media can be made relevant or apt according to the current situation, abilities or needs of the participating communication entities.

Figure 3:
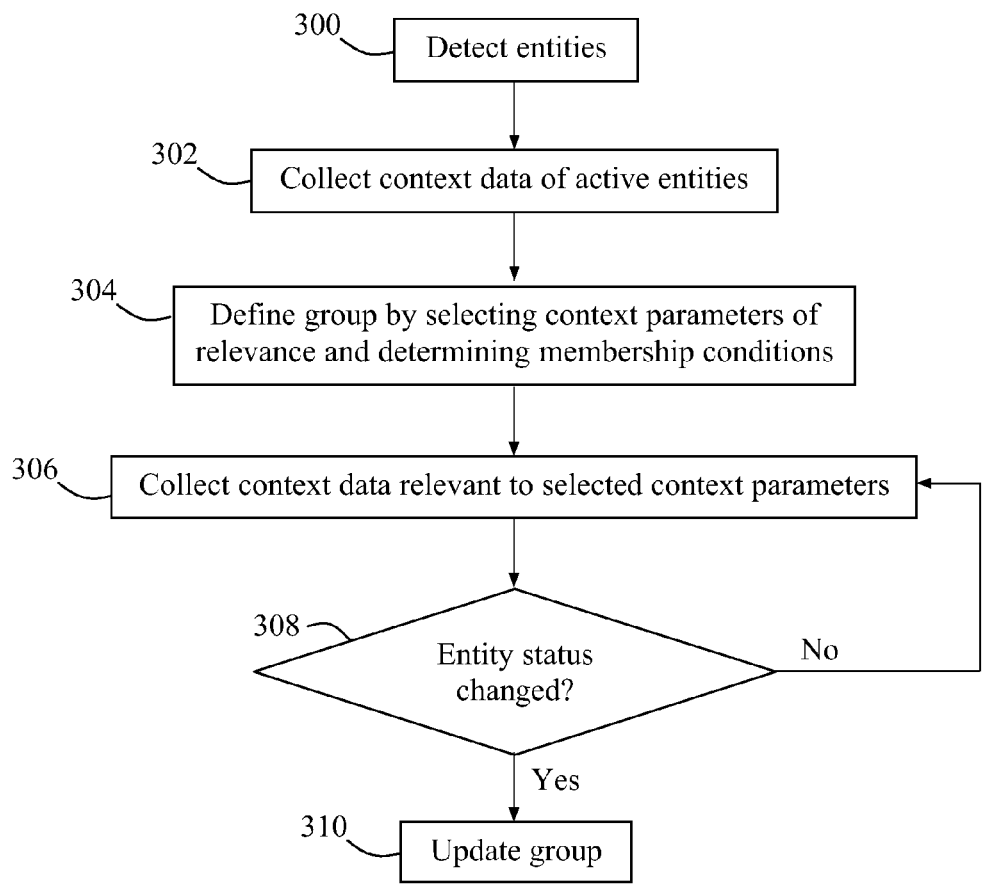
FIG. 3 is a flow chart illustrating a procedure for enabling services or media adapted to a group of communication entities, according to another embodiment.

FIG. 3 is a flow chart illustrating an exemplary procedure for handling a group of communication entities and for enabling services or media adapted thereto. The shown procedure may basically be executed by a GAF or equivalent functional unit residing in a group manager of a central service node, such as the GAF 202 in group manager 200 in FIG. 2. In a first step 300, various communication entities are generally detected in a communication network, which may include detecting entities that are active in a specific area, or log on to the network or log off therefrom, or similar.

A next step 302 illustrates that context data relating to a plurality of monitored active entities is collected, in order to survey the current situation of each respective entity. The context data may be obtained from entity profiles of those entities, e.g. the EP's 206 in FIG. 2. Based on this information, a group is defined or formed in a further step 304, containing members, or entities, that are found to be correlated in some way by having at least some feature or characteristics in common.

In this step, it may also be determined which features or characteristics are deemed relevant to the group in order to select context parameters that shall be monitored to survey the current situation of the group. For example, relevant context parameters may be selected by comparing the individual contexts and possibly weighting of different parameters, to find significant similarities, e.g. using a machine learning function. Alternatively, relevant context parameters may be actively selected by a set of individual users that wish to form or join the group, or may be selected from predefined context parameter templates, e.g. having pre-set relevancies which may have been set by an external party.

An example of the above can be as follows. A parameter that can be measured is temperature. Each entity is configured to monitor the temperature and send a SIP PUBLISH message to a presence server whenever the temperature changes. The measured temperature can then be used as a parameter determining how groups are defined, for instance by defining one group of users who are in areas with relatively low temperature, presumably being outdoors, and another group of users who are in areas with relatively high temperature, presumably being indoors. Hence, respective group profiles can be used to adapt the services according to measured context data, aggregated over the group members. Services delivered to the users in these groups can then be adapted differently depending on the temperature. For example, a music service delivered to users in low temperature areas may have the volume and tonal balance adjusted to a presumably higher ambient outdoor volume, and vice versa. Furthermore, a pre-set profile of the service delivery may then be used.

In another example, one set of monitored parameters relates to the situation of a particular system. This may be a fleet of electric cars belonging to a courier company. The cars must undergo technical service on a regular basis, and the timing of each servicing occasion should be set based on the history of the cars, the current state of the engines, and the time of a previous servicing occasion. It can then be determined which cars are to be serviced by measuring parameters relating to these aspects.

Further parameters that can also be measured in this example are the current position and battery status of each car, from which an anticipated range can be calculated to estimate whether they can arrive at the service station at the time the next car leaves the station, and so forth. This can be applied to control a current schedule for the cars, e.g. by allocating suitable routes to those cars which are in need of servicing so that they will be located close to the service station when time is available for service. Here, the grouping can be done in several steps, and the current situation can thus influence the definition of groups which can also be re-defined as required.

Returning to FIG. 3, the group is thus defined in step 304 by selecting context parameters that are deemed relevant and of interest to the group, to be monitored in the future. The group is further defined by determining conditions or rules for group membership basically by setting limits to the above-selected context parameters, where an entity is qualified as a member if its context parameters do not exceed the set limits, e.g. according to specific rules. For example, a temporary transgression of a context parameter limit can be accepted if the duration is not too long, and so forth. As indicated above, the operations in step 304 may be accomplished by means of a suitable machine learning function or the like, which is not necessary to describe here further to understand this invention.

Collecting context data of entities continues in a step 306, relating at least to the selected context parameters, such that this information is kept up-to-date. In a following step 308, it is generally determined whether the monitored entities have changed their status in a predetermined way that affects the group. For example, it may be checked if the membership conditions have been violated by one or more entities in the group by exceeding the set context parameter limits, e.g. to a certain predetermined extent, or if one or more entities have been logged off or moved away from a given area, or if one or more entities have entered or been logged on in the area, and so forth.

If the situation checked in step 308 has changed to a certain given extent, the group is generally updated in a step 310. For example, it may be suitable to update the group by excluding an entity from the group if that entity has exceeded the limit of a significant context parameter, or moved away from a given area, or if it has been logged off or changed its status in some other way that affects the group. The monitored entities may even have changed their status in a way that the group is altogether dissolved. Updating the group may also include modifying the membership conditions or rules determined in step 304 above, such as changing a context parameter limit.

If the situation has not changed sufficiently to induce a group update, e.g. as exemplified above, the process may return to step 306, as indicated in the figure. As similar to step 304, the operations in step 310 may be accomplished by means of a machine learning function or the like. In fact, it is possible to perform the entire process described for FIG. 3 more or less automatically by means of suitable machine learning functions and software, which can be regarded as an improvement as compared to manually executed proceedings.

Figure 4:
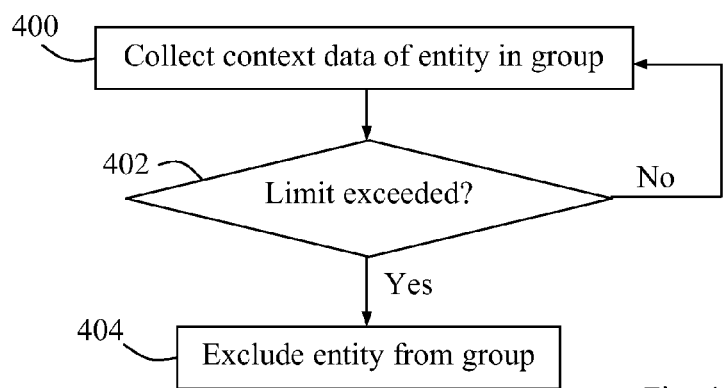
FIG. 4 is a flow chart illustrating a procedure for monitoring a specific communication entity that is a member of a group, according to yet another embodiment.

In FIG. 4, a flow chart is shown that illustrates an exemplary procedure that can be executed in a GAF or equivalent functional unit in a group manager of a central service node, for monitoring a specific entity of interest. The monitored entity is presently qualified as a member of a group that has previously been defined, e.g., according to steps 300-306 in FIG. 3 above. Thus, it is assumed that limits have been set for selected context parameters as conditions for membership in the group.

In a first shown step 400, context data of that entity is collected, e.g. by means of a corresponding IAF and EP according to FIG. 2, or as in step 308 above. It is then determined in a step 402 whether the monitored entity has exceeded any of the context parameter limits above, based on the newly collected context data. If not, the entity is still qualified as a group member and the process may return to step 400 for further collection of context data. However, if the entity has exceeded any of the context parameter limits to a certain predetermined extent, the entity is no longer qualified as a group member and the entity is therefore excluded from the group, in a final step 404.

Figure 5:
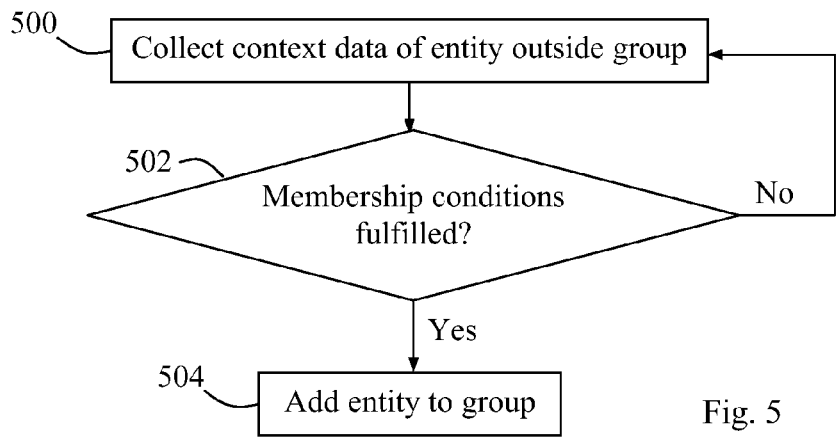
FIG. 5 is a flow chart illustrating a procedure for monitoring a specific communication entity that is not a member of a group, according to yet another embodiment.

In FIG. 5, a flow chart is shown that illustrates another exemplary procedure that can be executed in a GAF or equivalent functional unit in a group manager of a central service node, for monitoring a specific entity that is presently not a member of a given group having predetermined membership conditions.

In a first shown step 500, context data of that entity is collected, e.g. by means of a corresponding IAF and EP according to FIG. 2, or as in step 308 above. It is then determined in a step 502 whether the monitored entity fulfills the membership conditions by falling within the context parameter limits of the membership conditions, based on the context data collected in step 500. If not, the entity is not qualified as a group member and the process may return to step 500 for further collection of context data. On the other hand, if it is found in step 502 that the entity actually fulfills the given membership conditions by not exceeding the context parameter limits, the entity can be added as a member in the group, in a final step 504.

In the examples described above, communication entities or entity peers are monitored with respect to context parameters that have been selected as being of interest or relevance to a defined group. In order to survey the current situation of a plurality of entities or entity peers in this way, a master context can be defined as a reference point that represents the group as a whole by having representative or typical values of the relevant context parameters, which can be expressed as a "master context vector" in a logical multi-dimensional space or area. Each selected and relevant context parameter may thus correspond to a dimension, that is to say in a logical sense, and the master context vector will therefore be defined by values of each relevant context parameter.

The context data collected for different entities can also be expressed as logical individual context vectors which then can be compared with the master context vector to determine the logical deviation from the master context for each entity. This deviation can be calculated as the distance between the individual context vector and the master context vector, in a logical sense. A suitable distance metric can then be calculated as an Euclidian distance or a Manhattan distance, or any other suitable metric depending on the assumed topology of the multi-dimensional space or area.

For example, if the logical deviation of an entity from the master context exceeds a predefined limit, that entity may be deemed unqualified as a group member. It should be noted that the defined master context may not necessarily coincide with the context of an individual entity. The above-described logical master context vector and individual context vectors may be determined from the GP 208 and IP's 206, respectively, shown and described in the example of FIG. 2.

The master context can be used to identify the logical proximity of any individual entities that are thus mutually correlated or similar with respect to the selected and relevant context parameters. Such entities can therefore be determined as being qualified group members, and a group may encompass any number of entities or entity peers, e.g. 50-200 entities, effectively sharing the master context. Hence, the master context can be seen as an "average" or "preferred" context of the group and it will be more or less "in the middle" of such a group, logically speaking.

If the context parameter values collected for the entities change or fluctuate over time, the master context may become irrelevant or non-representative for the group and should therefore be updated from time to time when needed. Further, the membership conditions may also be updated by changing the context parameter limits according to the changing situation. In this way, any number of entity groups may be defined by means of corresponding master contexts. Groups may also be dissolved and reformed in adaptation to various activities that change the status of individual entities in the network, such as logoff, logon, geographic movements, service usage, and so forth.

Figure 6:
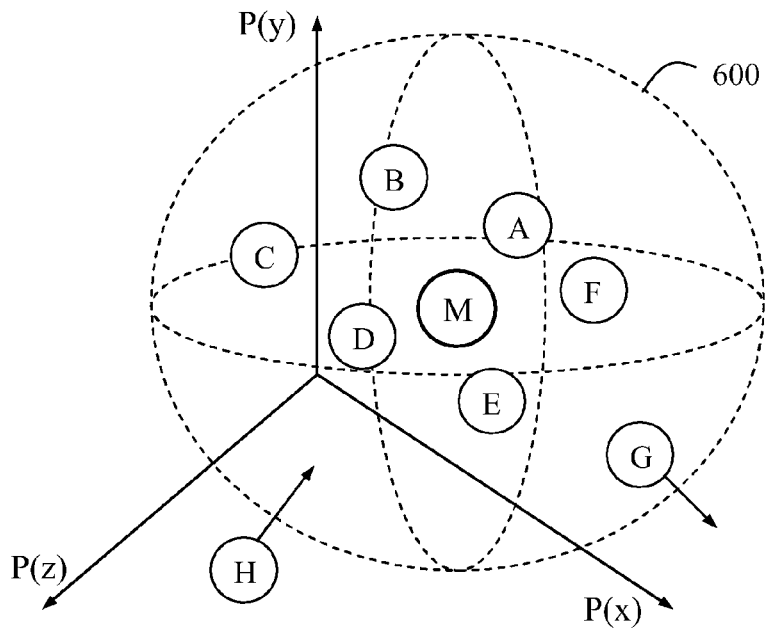
FIGS. 6 and 6a are schematic diagrams illustrating an example of how the current situation of entities can be surveyed with respect to three different context parameters, according to further embodiments.

FIG. 6 is a schematic diagram illustrating an example of how the current situation of entities can be surveyed with respect to three different context parameters selected as being relevant to a previously defined group, using the above-described master context approach. The three context parameters $P(x)$, $P(y)$ and $P(z)$ thus form a logical three-dimensional space shown as a logical 3-D context diagram. Context values have been collected for a plurality of entities A, B, C, . . . and each entity can therefore be represented in the diagram as a 3-D projection or vector where entity A has values $P(x)_A$, $P(y)_A$, $P(z)_A$, and so forth. It should be noted that the dimensions in this diagram are abstract or logic representations of the context parameters, and not physical dimensions even though one or more context parameters as such may relate to a geographical position or movement. A similar logical context representation can also be made for groups having any number of selected and relevant context parameters, and the present embodiments are generally not limited to using three relevant context parameters only.

The diagram thus shows the contexts of entities A, B, C, . . . at different spots in the 3-D projection. A defined master context "M" is located approximately in the middle of the individual entity contexts. Further, context parameter limits have been set relative to the master context M as dictating membership conditions for the group, which is shown as a group border 600. The group border is illustrated logically as a regular sphere in this example, although it can have any shape or contour in such a logical context diagram depending on how the membership conditions have been defined. The master context may then effectively constitute a centroid or the equivalent representing any entities that fall inside the group border 600, thereby qualifying as group members.

In the situation shown in FIG. 6, the contexts of entities A-G are currently located inside the group border 600, thereby qualifying those entities as members in the group, although entities may come and go in the diagram due to changing context parameter values, e.g. as collected in the steps 308, 400 and 500 described above. In the example of FIG. 6, the context of member G is moving outside the group border 600 and will therefore be deemed unqualified, while the context of a non-member H is moving inside the group border 600 to qualify entity H as a group member once inside the border 600.

Figure 6A:
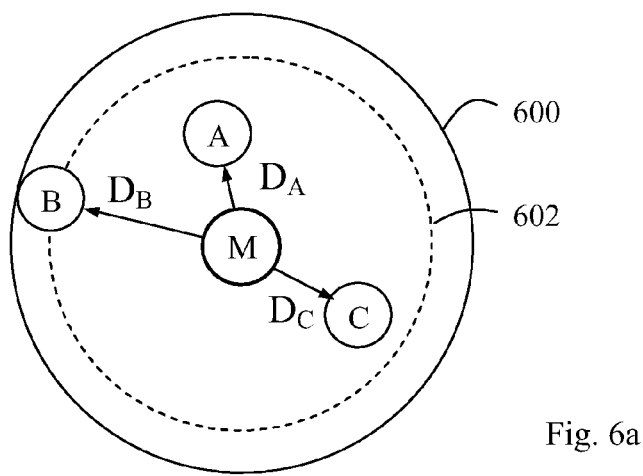

FIG. 6a illustrates how a deviation D from the master context M of FIG. 6 can be calculated for entities A-C as a logical "distance" between the master context M and each respective individual entity context. Thus, the context of entity A has a deviation $D_A$, the context of entity B has a deviation $D_B$, and the context of entity C has a deviation $D_C$ from the master context M. The predefined group border 600 thus represents the conditions for group membership.

Further, an update trigger condition may also be defined, as represented by an update trigger border 602 in the diagram, such that a group update is triggered once one or more group member contexts move outside the update trigger border 602, logically speaking. In the shown example, the context of entity B has just moved outside the update trigger border 602, which could trigger a group update depending on the implementation. The group update operation may involve updating the master context vector and/or the membership conditions, the latter impacting the shape of the group border 600.

The update trigger border 602 may be located inside the group border 600, as shown here, or outside, or partly inside and partly outside, or basically coinciding with the group border 600. Hence, the update trigger border 602 and the group border 600 may be defined independently. As in step 310 above, a machine learning mechanism or the like may be used to automatically perform the above updating of master context, membership conditions and/or update trigger condition.

Hence, by defining a master context M, a group border 600 and an update trigger border 602, and calculating a logical deviation D from the master context M for each individual entity context in the manner described above, the group of entities or entity peers can be managed automatically and be kept up-to-date as the individual context parameters of the entities change or fluctuate over time. Whenever needed, the group can be automatically updated with respect to any of: master context definition, membership conditions, and memberships of individual entities. Services and media can then be adapted to the group, as represented by the master context M, and be relevant or even optimal to the prevailing situation of the entities in the group, even when changing over time.

Furthermore, any number of such entity groups may be handled in the above-described manner by the group manager 200 in FIG. 2. For example, the logical 3-D diagram in FIG. 6 may be populated by a plurality of groups, each having a master context M and a group border 600 defined by means of the context parameters P(x), P(y) and P(z). As mentioned above, the above proceedings can be executed for any number of selected relevant context parameters, thus without limitation to the described example of three context parameters.

Figure 7:
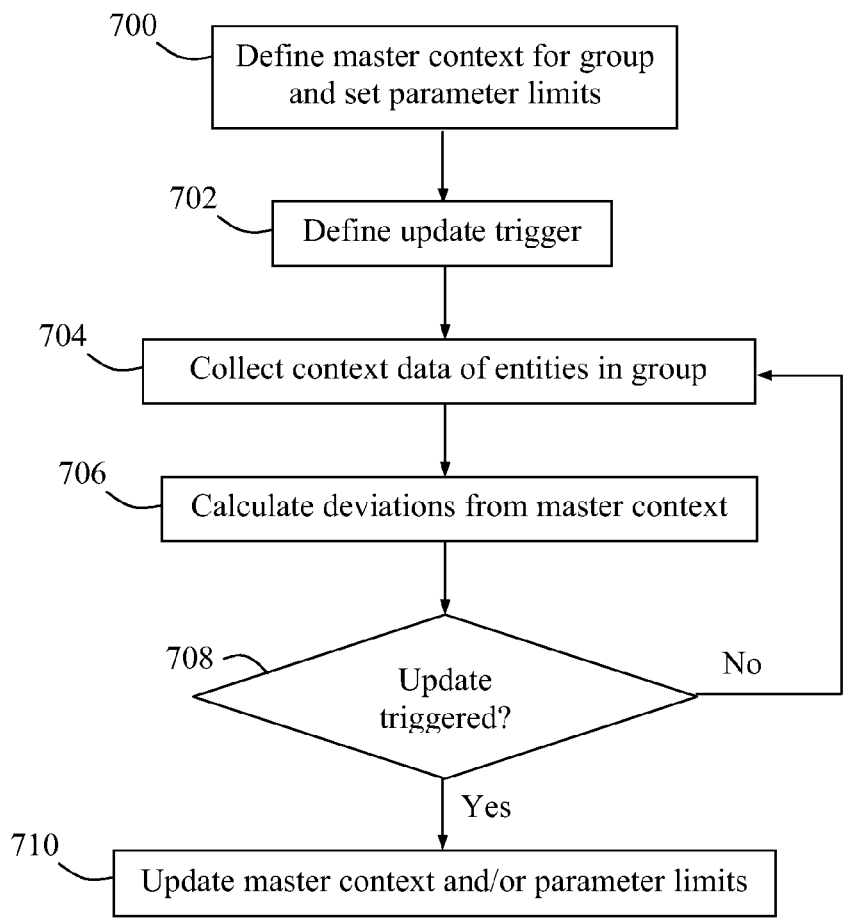
FIG. 7 is a flow chart illustrating a procedure for keeping group memberships up-to-date, according to yet another embodiment.

FIG. 7 is flow chart illustrating a procedure for keeping group definitions and resulting memberships up-to-date, using the above-described master context approach. This procedure can be executed in a GAF or equivalent functional unit in a group manager of a central service node. Again, it is assumed that a group of communication entities or entity peers has previously been defined and relevant context parameters have been selected, e.g., according to steps 300-304 in FIG. 3 above.

In a first step 700, a master context is defined for the group and limits are set for the selected context parameters relative to the master context, as conditions for membership in the group. The membership conditions and corresponding context parameter limits may be represented by a group border in a logical multi-dimensional space or area, as in FIG. 6, having the master context as a centroid or the like inside the group border. Thus, any entities that fall "inside" the group border, logically speaking, are deemed qualified as group members, as described above.

In a next step 702, an update trigger condition is defined, which dictates when a group update is to be performed. The update trigger condition may be defined as an update trigger border in the logical multi-dimensional space or area, such that a group update is triggered when one or more group member contexts move "outside" the update trigger border, e.g. as described above for FIG. 6a. A group update may also be triggered when one or more non-member contexts move "inside" the update trigger border. Alternatively, different update trigger conditions may be defined for context movements "outwards" and "inwards", respectively. It should be noted that the terms inside, outside, inwards and outwards refer to the logical representation of the contexts in a multi-dimensional context diagram as described above.

In a further step 704, context data is collected for entities within the group and optionally also outside the group, e.g. by means of a corresponding IAF and EP according to FIG. 2, or as in step 306 above. In a following step 706, logical deviations from the master context are calculated for the entities, e.g. the vectorial distance between the master context vector and each respective individual context vector in the multi-dimensional space or area, as described for FIG. 6a.

It is then determined in a step 708 whether the update trigger condition defined in step 702 is fulfilled or not, i.e. whether a group update is to be performed or not. If so, the group update is performed in a step 710 by updating the master context and/or the parameter limits of the membership conditions. Referring to the example in FIG. 6, updating the master context includes changing at least one of the associated parameter values in the master context vector which will effectively move the master context M in the 3-D diagram, whereas updating the parameter limits will change the location and/or shape of the group border 600. If the update trigger condition is not fulfilled in step 708, the process may return to step 704 for further collection of current context data of entities.

Referring to FIG. 2, a machine learning function or the like may be implemented in each IAF 204 adapted to collect context information from various sources (e.g. using the mechanisms described in WO 2006/115442), and to recommend which context parameters should be valid for a proposed group, based on the collected information. The EP's 206 can then be configured with information relating to the recommended context parameters.

The GAF 202 may then be configured to represent an arbitrary number of group members or entities having individual contexts, e.g. represented by contexts vectors in a logical multi-dimensional space or area as shown in FIG. 6. The GAF 202 operates on the GP 208 comprising the group-related context information which can be logically represented by the above-described master context vector. The GAF 202 can thus use the GP 208 to deduce an operational context of the current group, and hence an optimal or at least useful organisation or topology for the group.

Furthermore, the GAF 202 may provide recommendations to the IAF:s 204 of the group members regarding which context sources to use. The IAF:s 204 will then be able to determine which group member is closest to the centre or middle of the conceptual space. That group member will then be taken as a representative of the entire group. All group members contexts may then be represented by the context of that group member.

In order to implement the above, the GAF 202 may have a machine learning function adapted to collect information from individual context sources, e.g. the EP's 206, and to recommend context parameters based on this information in order to select information for the GP 208. Machine learning is generally a concept familiar to persons skilled in the art. Multiple implementations of a machine learning function exist, aimed at different application areas and using different programming languages and algorithms.

The IAF's 204 may then enable the individual entities to offer context sources to the group, and make them available to the members, e.g. depending on predefined policies for sharing information in the IAF's 204 and the GAF 202. The machine learning function in the GAF 202 may automatically recommend context sources to group members for subsequent automatic voting by recommendations by the members IAF:s.

A plurality of similar context sources may be available from group members with different levels of resolution or quality. Based on their data, the GAF 202 may converge on combined recommendations from the group based on metrics of the distance deviations, and the sources can be ranked and stored in the group profile, as representing the current entity group. This group recommendation of an optimal choice of context source, i.e. from one of the members to represent the group context, may be available to all members. Thus, the IAF:s 204 of the members can be represented by the individual members, while the selected representative member's IAF can be used by all group members.

Figure 8:
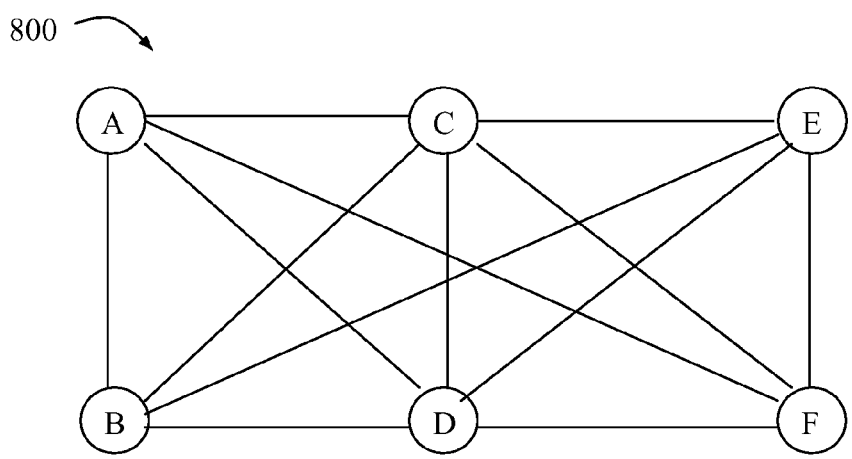
FIG. 8 is a schematic diagram illustrating the topology of an exemplary peer-to-peer network.

The mechanisms described above can be utilised to compute an optimal network configuration for a plurality of entities or peers, e.g. with the intent of allowing entities to consume services which are made available by one entity. With reference to FIG. 8, a network 800 of entities or entity peers can thus be optimised to facilitate this according to the following example involving six entities A-F in total.

In this example, three selected and relevant context parameters are considered relating to services consumed, services provided, and a connection quality. Thus, each individual entity has values of the above three context parameters in a context vector: For example, the latter context parameter can be a combination of the inverse of the latency and the available bandwidth. The network quality can be determined for each mutual connection between the entities A-F, which are illustrated in the figure as connections A-B, A-C, B-C, etc.

A resulting context parameter of connection quality can then be calculated as the average connection quality of each entity: For example, the average connection quality of entity A is calculated as the average of connections A-B, A-C, A-D, A-E, and A-F. Corresponding calculations can be made for each one of the other entities B-F as well. A master context or centroid of the network can then be determined as a vector with values of the three context parameters, using the above-described units GAF and IAF as follows:

The IAF:s of all the members and potential members of the group provide their context information to the GAF. Then, GAF computes an optimal configuration based on the context information. The vectors of the entities are used to compute the optimal configuration, as described for FIGS. 6 and 6a. In this example, it is found that entities A, B and E have mutually similar context vectors while entities C, D and F have mutually similar context vectors. Consequently, an optimal configuration can be obtained by defining a first group with entities A, B and E and a second group with entities C, D and F. A master content vector can also be determined for each respective group, as described above.

Figure 9:
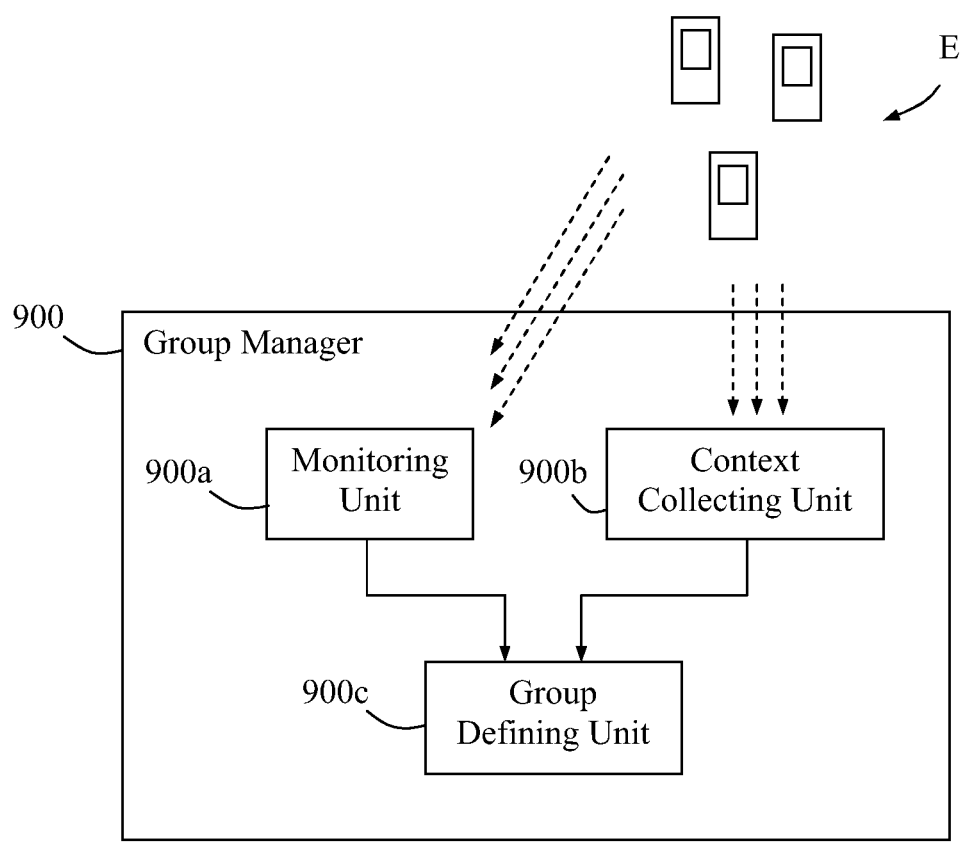
FIG. 9 is a block diagram illustrating a group awareness function in more detail, according to further embodiments.

FIG. 9 illustrates in more detail an apparatus in a group manager 900 of a central service node for enabling services or media in a communication network, according to further embodiments. The group manager 900 comprises a monitoring unit 900a adapted to detect and monitor communication entities E in the network, and a context collecting unit 900b adapted to collect individual context data relating to a plurality of monitored entities E in order to survey the current situation of each respective entity.

The group manager 900 further comprises a group defining unit 900c adapted to define a group of correlated entities that are found to be correlated or similar with respect to at least some feature or characteristics based on the collected context data, by selecting context parameters of relevance to the group and determining membership conditions for the group. The group defining unit 900c is further adapted to update the group if the monitored entities have changed their status in a predetermined way that affects the group.

Some possible advantages or favourable features that may be obtained by the above-described embodiments include:

Automatic selection and sharing of a group context from a context source originating from one of the members.

Optimal updating of the group when a more representative context source becomes available to the group, e.g., when a new entity logs on to the network. A new group configuration may also provide a better representation for users in the group.

Dynamically providing a representative master context, even when the group itself cannot provide built-in context sources.

Graded levels of trust can be assigned to context sources in groups which when combined can be used for second opinions and greater reliability as well as fault tolerance. If the group does not automatically take the context altogether, but the members may have different weights for different context sources, then the different context sources might be trusted differently. If there are multiple similar context sources, they can be used to determine what the value should be; this also allows for fault tolerance.

Automatic and gradual change in a so-called "Quality of Context" (QoC) when some of these context sources become available or unavailable.

Automated re-configuration of the interconnections between entities in a peer-to-peer network to reflect the optimal situation for the concerned entities.

The embodiments described above can be applied in a private or local network using a HIGA (Home IMS Gateway) for accessing services and media on the Internet, as managed by applications and control nodes of an IMS network. A HIGA can further be used to interconnect local entities or devices in a UPnP (Universal Plug and Play) network with the IMS network, UPnP being a protocol for sharing of media between devices in private networks.

Although UPnP lacks functions for distribution of media over a public wide-area network, it may be desirable for a private network to establish communications for media sharing with entities in other private networks. The HIGA enables IMS-authenticated remote access to set up secure tunnels between IMS-enabled devices and the HIGA, also when these IMS-enabled devices reside in other HIGA networks.

While this can be used for creating a one-on-one connection between two HIGA networks, it is not suitable for interconnecting entities in multiple HIGA networks. In such a situation, it is more feasible to use secure versions of application-level protocols, e.g. SIP over IPSEC, or HTTP-S, to transport the actual data. As a result, the HIGA:s are able to create a logical mesh network and to access data using HTTP-S. However, this invention can also be used to form such a mesh network of HIGA:s for media sharing.

When a HIGA connects to a network, it will set up a session to other IMS-connected systems, e.g. including service provider application servers and other HIGA:s with which it may be desirable to exchange media and services. An initial discovery process of finding other HIGA networks that might be suitable for the exchange of media and services, can be done using the presence functionality, assuming that available media and services, e.g. suitable media files, are aggregated by the HIGA and published to the IMS presence service using standard methods as described above. The discovery process may depend on various factors, such as what media files are available in the HIGA:s private networks, connectivity, capacity of servers, and so forth.

When the presence mechanism is used by a HIGA network to publish its available files and other context information, a GAF having the functionality described above can be located in a presence server of the IMS network. In that case, IAF:s of the individual HIGA:s can be used to provide the information in their logical individual context vectors to the connectivity context, and this can then be used to compute an optimal network configuration for a plurality of entities or peers, e.g. as described above with reference to FIG. 8.

The above-described GAF functionality may be implemented in a computer program product, comprised in or for use by a group manager or similar, the computer program product being a memory, in particular an electronic memory, and comprising or carrying computer readable code means which when run by a group manager causes the group manager to perform the steps and operations according to the above-described embodiments.

While the invention has been described with reference to specific exemplary embodiments, the description is generally only intended to illustrate the inventive concept and should not be taken as limiting the scope of the invention. The present invention is defined by the appended claims.

The invention claimed is:

1. A method in a group manager of a central service node, of enabling services or media in a communication network, comprising the following steps:
   detecting activities and conditions of communication devices in the network,
   for each of a plurality of entities, collecting individual context data relating to the entity, the individual context data comprising a first data value corresponding to a first behavioral context parameter, and a second data value corresponding to a first environmental context parameter, wherein first behavioral context parameter is separate and distinct from the first environmental context parameter,
   for each of the plurality of said entities, creating an individual context vector for said entity from said collected individual context data related to said entity, wherein each of said plurality of context vectors identifies a point in a logical, as opposed to a physical, N-dimensional space, where N is greater than or equal to two,
   creating a master context vector comprising a third data value corresponding to the first behavioral context parameter, and a fourth data value corresponding to the first environmental context parameter, wherein the master context vector identifies a centroid point in the logical N-dimensional space,
   for each of the plurality of said individual context vectors, determining the distance between the centroid point and the point identified by said individual context vector,
   defining a group of correlated entities that are found to be correlated with respect to one or more features or characteristics based on the collected individual context data by including an entity in the group in response to determining that the distance between the centroid point and the point identified by said individual context vector corresponding to said entity is less than a threshold.

2. The method according to claim 1, wherein the group is updated if the membership conditions have been violated by one or more monitored entities.

3. The method according to claim 1, wherein the group is updated if one or more monitored entities have been logged off or moved away from a given area, or if one or more entities have entered or been logged on in the area.

4. The method according to claim 1, wherein updating the group includes changing the context parameters of relevance and/or the membership conditions.

5. The method according to claim 1, wherein updating the group includes excluding or adding an entity from/to the group.

6. The method according to claim 1, wherein detecting communication entities in the network includes detecting entities that are active in a specific area, or log on to the network or log off therefrom.

7. The method according to claim 1, wherein the collected individual context data is taken from individual entity profiles which contain information on the respective monitored entities (A, B, C, . . . ), compiled from incoming context and presence data.

8. The method according to claim 1, wherein the selected context parameters of relevance to the group define the common characteristics of the group, which is manifested in a Group Profile that can be used as a basis for producing adapted communication services or media for the group.

9. The method according to claim 1, wherein said relevant context parameters are selected by comparing the individual contexts to find entities correlated with respect to the one or more features or characteristics, using a machine learning function, or actively selected by a set of individual users that wish to form or join the group, or selected from predefined context parameter templates.

10. An apparatus in a group manager of a central service node for enabling services or media in a communication network, comprising:
   a monitoring unit adapted to detect activities and conditions of communication devices in the network,
   a context collecting unit adapted to, for each of a plurality of entities, collect individual context data relating to the entity, the individual context data comprising a first data value corresponding to a first behavioral context parameter, and a second data value corresponding to a first environmental context parameter, wherein first behavioral context parameter is separate and distinct from the first environmental context parameter,
   a context vector unit adapted to, for each of the plurality of said entities, create an individual context vector for said entity from said collected individual context data related to said entity wherein each of said plurality of context vectors identifies a point in a logical, as opposed to a physical, N-dimensional space, where N is greater than or equal to two, the context vector unit further adapted to create a master context vector comprising a third data value corresponding to the first behavioral context parameter, and a fourth data value corresponding to the first environmental context parameter, wherein the master context vector identifies a centroid point in the logical N-dimensional space,
   a distance calculating unit adapted to determine, for each of the plurality of said individual context vectors, the distance between the centroid point and the point identified by said individual context vector, and
   a group defining unit adapted to define a group of correlated entities that are found to be correlated or similar with respect to one or more features or characteristics based on the collected individual context data by including an entity in the group in response to determining that the distance between the centroid point and the point identified by said individual context vector corresponding to said entity is less than a threshold.

11. The apparatus according to claim 10, wherein the group defining unit is further adapted to update the group if the membership conditions have been violated by one or more monitored entities.

12. The apparatus according to claim 10, wherein the group defining unit is further adapted to update the group if one or more monitored entities have been logged off or moved away from a given area, or if one or more entities have entered or been logged on in the area.

13. The apparatus according to claim 10, wherein updating the group includes changing the context parameters of relevance and/or the membership conditions.

14. The apparatus according to claim 10, wherein updating the group includes excluding or adding an entity from/to the group.

15. The apparatus according to claim 10, wherein detecting communication entities in the network includes detecting entities that are active in a specific area, or log on to the network or log off therefrom.

16. The apparatus according to claim 10, wherein the group defining unit is further adapted to take the collected individual context data from individual entity profiles which contain information on the respective monitored entities (A, B, C, . . . ), compiled from incoming context and presence data.

17. The apparatus according to claim 10, wherein the selected context parameters of relevance to the group define the common characteristics of the group, which is manifested in a Group Profile that can be used as a basis for producing adapted communication services or media for the group.

18. The apparatus according to claim 10, wherein the group defining unit is further adapted to select said relevant context parameters by comparing the individual contexts to find entities correlated with respect to the one or more features or characteristics using a machine learning function, or actively selected by a set of individual users that wish to form or join the group, or selected from predefined context parameter templates.

* * * * *